(12) United States Patent
Garin et al.

(10) Patent No.: US 8,983,492 B2
(45) Date of Patent: Mar. 17, 2015

(54) METHODS AND APPARATUSES FOR AFFECTING A MOTION MODEL WITHIN A MOBILE DEVICE

(71) Applicant: QUALCOMM Incorporated, San Diego, CA (US)

(72) Inventors: Lionel Jacques Garin, Palo Alto, CA (US); Sundar Raman, Fremont, CA (US); Douglas Rowitch, Honolulu, HI (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/711,542

(22) Filed: Dec. 11, 2012

(65) Prior Publication Data

US 2013/0344901 A1      Dec. 26, 2013

Related U.S. Application Data

(60) Provisional application No. 61/662,771, filed on Jun. 21, 2012, provisional application No. 61/722,061, filed on Nov. 2, 2012.

(51) Int. Cl.
| | | |
|---|---|---|
| H04W 24/00 | (2009.01) | |
| H04W 4/02 | (2009.01) | |
| G01S 5/02 | (2010.01) | |

(52) U.S. Cl.
CPC ............... *H04W 4/026* (2013.01); *G01S 5/021* (2013.01)
USPC ...................................................... 455/456.1

(58) Field of Classification Search
CPC ................................ H04W 64/00; H04W 4/02

USPC ........... 455/456.1, 456.2, 456.4, 456.5, 456.6
See application file for complete search history.

(56) References Cited

U.S. PATENT DOCUMENTS

| | | | |
|---|---|---|---|
| 7,642,959 B2 | 1/2010 | Abraham et al. | |
| 2009/0312038 A1 | 12/2009 | Gildea | |
| 2010/0073229 A1 | 3/2010 | Pattabiraman et al. | |
| 2010/0081458 A1 | 4/2010 | Sheynblat et al. | |
| 2010/0309051 A1 | 12/2010 | Moshfeghi | |
| 2011/0012781 A1 | 1/2011 | Ronald et al. | |
| 2011/0065457 A1* | 3/2011 | Moeglein et al. | 455/456.6 |
| 2012/0165041 A1* | 6/2012 | Jang et al. | 455/456.1 |
| 2012/0309410 A1* | 12/2012 | Marti et al. | 455/456.1 |
| 2012/0309411 A1* | 12/2012 | MacGougan et al. | 455/456.1 |
| 2013/0053059 A1* | 2/2013 | Kruglick | 455/456.1 |
| 2013/0225209 A1* | 8/2013 | Chen et al. | 455/456.6 |

FOREIGN PATENT DOCUMENTS

EP      2214031 A1      8/2010

OTHER PUBLICATIONS

International Search Report and Written Opinion—PCT/US2013/045286—ISA/EPO—Dec. 3, 2013.

* cited by examiner

*Primary Examiner* — Christopher M Brandt
(74) *Attorney, Agent, or Firm* — Berkeley Law & Technology Group, LLP

(57) ABSTRACT

Methods, apparatuses and articles of manufacture are provided which may be implemented, at least in part, in a mobile device and used to affect one or more motion models and/or the like based, at least in part, on one or more determined range rates for one or more wireless signals acquired from one or more terrestrial transmitters. Here, for example, a range rate may be determined based, at least in part, on a measured phase value and/or a measured Doppler value.

60 Claims, 4 Drawing Sheets

METHODS AND APPARATUSES FOR AFFECTING A MOTION MODEL WITHIN A MOBILE DEVICE

CLAIM OF PRIORITY UNDER 35 U.S.C. §119

This application claims priority under 35 USC 119 to U.S. Provisional Application Ser. No. 61/662,771, filed Jun. 21, 2012, and entitled, "METHODS AND APPARATUSES FOR AFFECTING A MOTION MODEL WITHIN A MOBILE DEVICE", which is assigned to the assignee hereof and which is incorporated herein by reference.

This application claims priority under 35 USC 119 to U.S. Provisional Application Ser. No. 61/722,061, filed Nov. 2, 2012, and entitled, "METHODS AND APPARATUSES FOR AFFECTING A MOTION MODEL WITHIN A MOBILE DEVICE", which is assigned to the assignee hereof and which is incorporated herein by reference.

BACKGROUND

1. Field

The subject matter disclosed herein relates to electronic devices, and more particularly to methods, apparatuses and articles of manufacture for use in affecting a motion model within a mobile device based, at least in part, on one or more determined range rates for one or more wireless signals acquired from one or more terrestrial transmitters.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile devices, and particularly in outdoor environments. However, since some satellite signals may not be reliably received and/or acquired by a mobile device within a specific environment, different techniques may be employed to enable position location services.

For example, mobile devices may attempt to obtain a position fix by measuring ranges to one or more terrestrial transmitters (e.g., wireless access point devices, beacons, cell towers, etc.) which are positioned at particular locations. Such ranges may be measured, for example, by obtaining a MAC ID address or some other transmitter identifier from signals received from such transmitters and obtaining range measurements to the transmitters by measuring one or more characteristics of signals received from such transmitters such as, for example, signal strength, a round trip time delay, etc.

In addition to satellite position systems and specific positioning systems, existing wireless carrier infrastructures may enable observed time difference of arrival (OTDOA) and/or advanced forward link trilateration (AFLT) techniques for estimating the locations of mobile devices. Here, with knowledge of the locations of neighboring base station transmitters and time-reference data, a mobile station may measure a range to such base station transmitters based upon an observed signal propagation delay (e.g., by comparing a phase of an acquired signal to a time reference).

As pointed out above, certain navigation techniques and/or AFLT techniques typically involve measuring ranges to transmitters at known fixed locations. As such, movement of a mobile device may be detected if there is a measurable difference or change in range to a fixed-location transmitter over time. In extreme multipath environments, however, measurements of changes in range using certain navigation and/or AFLT techniques may not be reliable for measuring small changes in position that would indicate smaller movements.

SUMMARY

In accordance with certain example implementations, a method may be provided which comprises at a mobile device located within a specific environment: determining a range rate for at least one terrestrial transmitter having a fixed location based, at least in part, on a measured phase value and/or a measured Doppler value determined based, at least in part, on at least one signal acquired from the at least one transmitter during a first period of time; determining a threshold value based, at least in part, on a signal strength of the at least one signal; and affecting a motion model based, at least in part, on the range rate and the threshold value.

In certain instances, a method may further comprise: affecting at least one positioning capability of the mobile device based, at least in part, on the motion model. In certain instances, a method may further comprise: determining a position uncertainty parameter based, at least in part, on the range rate, the position uncertainty parameter being indicative of a likelihood that a position of the mobile device changed during at least a portion of the first period of time; and wherein the affecting the motion model comprises: affecting the motion model based, at least in part, on the position uncertainty parameter.

In accordance with certain other example implementations, an apparatus may be provided for use in a mobile device that may be located within a specific environment. Here, for example such an apparatus may comprise: means for determining a range rate for at least one terrestrial transmitter having a fixed location based, at least in part, on a measured phase value and/or a measured Doppler value determined based, at least in part, on at least one signal acquired from the at least one transmitter during a first period of time; means for determining a threshold value based, at least in part, on a signal strength of the at least one signal; and means for affecting a motion model based, at least in part, on the range rate and the threshold value.

In accordance with still other example implementations, a mobile device may be provided which comprises: a receiver; and a processing unit to: with the mobile device located within a specific environment and during a first period of time, obtain via the receiver at least one signal transmitted from at least one terrestrial transmitter having a fixed location; determine a range rate for the at least one terrestrial transmitter based, at least in part, on a measured phase value and/or a measured Doppler value determined based, at least in part, on at least one signal acquired from the at least one transmitter during a first period of time; determine a threshold value based, at least in part, on a signal strength of the at least one signal; and affect a motion model based, at least in part, on the range rate and the threshold value.

In accordance with yet other example implementations, an article of manufacture may be provided which comprises a non-transitory computer readable medium having stored therein computer implementable instructions executable by at least one processing unit of a mobile device to, with the mobile device located within a specific environment: determine a range rate for at least one terrestrial transmitter having a fixed location based, at least in part, on a measured phase value and/or a measured Doppler value determined based, at least in part, on at least one signal acquired from the at least one transmitter during a first period of time; determine a threshold value based, at least in part, on a signal strength of the at least one signal; and affect a motion model based, at least in part, on the range rate and the threshold value.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
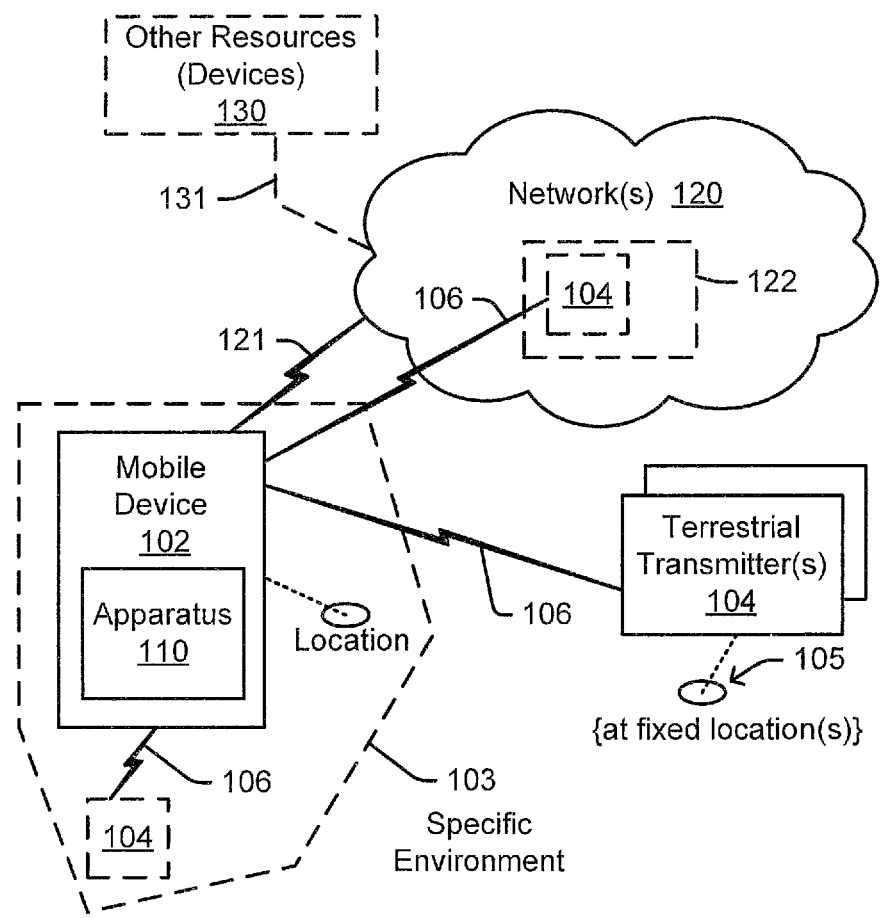
FIG. 1 is a schematic block diagram illustrating an example environment that includes a mobile device comprising an apparatus for use in affecting a motion model based, at least in part, on one or more determined range rates for one or more wireless signals acquired from one or more terrestrial transmitters, in accordance with an implementation.

As described in greater detail herein, various example methods, apparatuses and articles of manufacture are provided which may be implemented in a mobile device and used to affect one or more motion models and/or the like based, at least in part, on one or more determined range rates for one or more wireless signals acquired from one or more terrestrial transmitters. By way of example, a motion model may comprise a filter and/or other like algorithm that may be used to estimate a state of the mobile device and possibly a variance or uncertainty of such an estimate. For example, a filter may comprise a Kalman filter, a particle filter, and/or some other like filter based on one or more of a Bayesian model, a hidden Markov model, and/or the like or some combination thereof.

By way of an initial example, in certain implementations a mobile device that may be located within a specific environment may determine one or more range rates for one or more wireless signals acquired from one or more terrestrial transmitters. The terrestrial transmitters may each be positioned at different fixed locations. For example, in certain instances a terrestrial transmitter may comprise a base station and/or other like terrestrial-based transmitter associated with a wireless communication system/network. For example, in certain instances a terrestrial transmitter may comprise a wireless access point and/or other like terrestrial-based transmitter associated with a wireless computing system/network.

A range rate may for example be based, at least in part, on a measured phase value and/or a measured Doppler value determined from an acquired signal during a first period of time. For example, a range rate may be indicative of certain motion of a mobile device, e.g., a range rate may be affected by a motion of a mobile device in a direction toward/away from a terrestrial transmitter having a fixed location. Thus, for example, certain changes in range rate during some period of time may indicate that a mobile device may be in motion. Conversely, for example, certain other changes and/or the lack thereof in a range rate during some period of time may indicate that a mobile device may not be in motion.

In accordance with certain aspects of the present description, a mobile device may, for example, determine a threshold value that may be used to test or otherwise determine a likelihood as to whether a mobile device may or may not be in motion. For example, a test may be based, at least in part, on one or more range rates in comparison to at least one threshold value. A threshold value may, for example, be determined based, at least in part, on a signal strength and/or other like measurement(s) of one or more acquired signal(s). For example, in certain implementations a threshold value may be based, at least in part, on a measured signal to noise and/or interference ratio, e.g., such as, a measured Ec/Io in a cellular/AFLT application (e.g., of a cellular network) capable of serving the mobile device while the mobile device is located within at least a portion of a specific environment.

A mobile device may, for example, determine whether one or more range rate(s) may or may not satisfy one or more test(s) that may be based at least in part on one or more threshold value(s). In response to a determination that a range rate satisfies such test(s), a mobile device may, for example, affect a motion model and/or the like in some manner to decrease at least one position uncertainty parameter and/or other like input(s) to indicate that the mobile device was likely not in motion during the first period of time.

Conversely, in certain example implementations, in response to a determination that a range rate does not satisfy such test(s), a mobile device may affect such a motion model and/or the like in some manner to increase at least one position uncertainty parameter and/or other like input(s) to indicate that the mobile device was likely in motion during the first period of time.

In certain further implementations, in response to a determination that a range rate satisfies such one or more test(s), a first estimated speed and/or velocity of the mobile device during at least a portion the first period of time may be determined. For example, in certain instances, a mobile device may determine a first estimated speed and/or velocity based, at least in part, on one or more range rates (and/or one or more measured phase values and/or measured Doppler values) for one or more signals acquired from one or more terrestrial transmitters.

In certain further example implementations, a second estimated speed and/or velocity of the mobile device at a time subsequent to the first period of time may be determined, for example, based, at least in part, on the first estimated speed and/or velocity. For example, a second estimated speed and/or velocity of a mobile device at a time subsequent to the first period of time may be determined, at least in part, using a motion model (e.g., within a particle filter, and/or the like) to propagate the first estimated speed and/or velocity to the subsequent time.

In accordance with certain example implementations, a mobile device may further determine its estimated position (e.g., its approximate location at a time subsequent to a first period of time) based, at least in part, on a second estimated speed and/or velocity of the mobile device.

In accordance with certain example implementations, mobile device may further affect a selection of one or more candidate signals for acquisition in the future (e.g., in support of a tracking capability and/or the like) based, at least in part, on the second estimated speed and/or velocity of the mobile device. For example, it may be beneficial to search for or otherwise attempt to acquire wireless signals transmitted by certain particular terrestrial transmitters in areas/regions that a mobile device may be moving towards and/or expected to reach at some point in time. Conversely, for example, it may be beneficial to no longer search for or otherwise attempt to acquire wireless signals transmitted by certain other terrestrial transmitters and areas/regions that a mobile device may be moving away from and/or is expected to leave it some point in time.

In accordance with certain example implementations, with the techniques provided herein a mobile device may estimate its speed and/or velocity based, at least in part, on a measured phase values and/or measured Doppler values obtained from acquired wireless signals transmitted by various terrestrial transmitters at different fixed locations. Additionally, with the techniques provided herein a mobile device may determine a threshold value that may be used to test or otherwise determine whether the mobile station may or may not be in motion. For example, a threshold test may be provided as part of a motion detector algorithm and/or the like which may also support or otherwise be used for speed and/or velocity pinning and updating user motion model, e.g., through estimated speed and/or velocity propagation.

In certain example implementations, movement of a mobile device may be detected by determining range rates for signals acquired from terrestrial transmitters (e.g., Wi-Fi access point(s), cellular base station(s), dedicated location beacon(s), etc.) having fixed locations.

As used herein, the term "fixed location" with regard to the terrestrial transmitter is intended to indicate that a terrestrial transmitter may be installed at a particular location for a period of time that may be indefinite and/or which is otherwise substantially longer than the first period of time associated with a determined range rate. Thus, for example while most terrestrial transmitters may indeed be fixed at some essentially permanent location, there may be other terrestrial transmitters which are temporarily located at a fixed position for at least some extended period of time that is greater than the first period time associated with a determined range rate as provided herein. One example of a temporarily located terrestrial transmitter may be one that is located on a truck or other like movable platform and which may be provided to supply temporary/additional communication support to one or more communication/computing networks.

A range rate may, for example, be determined using one or more measured phase values and/or one or more measured Doppler values obtained from such acquired signals. Note that the techniques do not necessarily rely on determining a range (e.g. a linear distance) from a mobile device to a terrestrial transmitter, but instead determine and make use of a range rate. In particular implementations of measuring speed and/or velocity from measured Doppler values, for example, an expected error in a Doppler measurement may be affected or change depending on particular factors such as, for example, signal strength and/or presence of a receiver noise. In accordance with certain aspects, it has been observed that Doppler error may not be significantly affected by the presence of multipath(s). Thus, for example, a range rate based, at least in part, on one or more measured phase values and/or one or more measured Doppler values may not be as susceptible to errors due to the presence of multipath(s) as might be certain ranges used in other techniques. Thus, as described in greater detail herein, assuming a particular statistical distribution of measurement errors as a function of carrier energy to noise, a threshold value may be determined for use in achieving motion detection performance at a desired probability of detection/probability of false alarm level, e.g., through a test or other like algorithm. Such a threshold value may, for example, be further based, at least in part, on other factors such as, e.g., past performance, prior user interaction, just to name a couple of examples.

In certain other example implementations, different range rates to multiple terrestrial transmitters may be combined using trilateration and/or other like techniques to estimate a speed and/or velocity of the mobile device. A threshold may then be applied to a magnitude of the estimated speed and/or velocity to determine whether the mobile device is likely in motion. In the case of measuring these range rates using measured phase values and/or measured Doppler values, a threshold value may be similarly determined based at least in part on a measured signal strengths signals from one or more of the fixed location terrestrial transmitters.

As used herein, the term "specific environment" is intended to represent an environment that a mobile device may be transported through and/or moved about within. A mobile device may, for example, be transported and/or moved about by a "user", such as, e.g., a person, an animal, a machine, etc. Furthermore, in certain example instances, such a "specific environment" may represent an SPS-denied environment, wherein a mobile device may be unable to acquire applicable SPS signals for use in positioning, navigation, timing, etc. For example, in certain SPS-denied environments an SPS signal may be blocked or otherwise interfered with by one or more objects located between an SPS satellite or other like SPS signal transmitting device and the mobile device. Hence, in certain instances an SPS signal may be affected by one or more natural and/or man-made structures, other transmitting and/or receiving electronic devices, one or more plants and/or animals, a passing train, an atmospheric event, certain results of solar activities, etc. Accordingly, in certain instances a specific environment may comprise all or part of one or more indoor spaces and/or one or more outdoor spaces. Hence, for example, in certain instances a specific environment may comprise all or part of one or more floors of a building, or possibly all or part of a plurality of buildings, which may be interconnected via one or more indoor and/or outdoor paths, etc., which may be navigated by a user. A specific environment may comprise all of part of a school campus, all or part of an open air shopping center, all or part of a cruise ship, all of part of an airport, and/or the like, just to name a few examples.

Attention is drawn to FIG. 1, which is a schematic block diagram illustrating an example environment 100 that includes a mobile device 102 comprising an apparatus 110 for use in affecting a motion model based, at least in part, on one or more determined range rates for one or more wireless signals 106 acquired from one or more terrestrial transmitters 104, in accordance with certain example implementations.

As shown, environment 100 comprises mobile device 102 which may be located, at times, within a specific environment 103. Specific environment 103 may, for example, comprise all or part of one or more natural and/or man-made structures, and/or some combination thereof, which would not typically be considered to solely represent and outdoor environment. For example, specific environment 103 may comprise all or part of a building, all or part of a shopping center, all or part of an airport, all or part of a campus and/or grouping of inter-connected buildings/structures, etc.

Also illustrated within environment 100 are several example terrestrial transmitters 104, each of which may be located at a respective fixed location 105. For example, as illustrated one or more terrestrial transmitters 104 may be located inside or outside of specific environment 103. In certain example implementations, one or more terrestrial transmitters 104 may be provided as part of one or more networks 120. For example one or more terrestrial transmitters 104 may be provided as part of a cellular/AFLT application 122 and/or the like.

A terrestrial transmitter 104 may transmit a wireless signal 106 that may be acquired by a mobile device 102 while operating within environment 100, and more specifically while mobile device 102 is located within specific environment 103. In certain instances, as mobile device 102 is moved about within specific environment 103 it may be beneficial for the mobile device to maintain/update a selection of one or more candidate signals transmitted by one or more terrestrial transmitters 104 to be searched for and/or otherwise attempted to be acquired. In certain example implementations, apparatus 110 may affect such a selection of candidate signals.

As described in greater detail below, having acquired one or more wireless signals 106, mobile device 102 may obtain measured phase values and/or measured Doppler values with regard to the wireless signals and determine one or more corresponding range rates based, at least in part, thereon, e.g., using apparatus 110.

In certain instances mobile device 102 may communicate with one or more other resources (devices) 130 via network(s) 120 as illustrated by the wireless signal(s) 121 and/or wired signal(s) 131. In certain implementations wireless signal(s) 121 and/or wired signal(s) 131 may comprise one or more wired and/or wireless communication links, which may provide for one-way or bidirectional communication. Although illustrated as separate wireless signals in environment 100, it should be recognized that in certain example implementations wireless signal 106 may comprise all or part of wireless signal 121, and/or all or part of a wireless signal 121 may comprise all or part of a wireless signal 106.

Mobile device 102 is intended to represent any electronic device that may be reasonably moved about within a specific environment 103. By way of some non-limiting examples, mobile device 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, a tracking device, etc., which may be carried with and/or moved about by a person. In certain other non-limiting examples, mobile device 102 may comprise a machine, a vehicle, a container, a platform, and/or some other like object that may be moved directly and/or indirectly about within specific environment 103 in some manner by a person.

Apparatus 110 is representative of circuitry, such as, e.g., hardware, firmware, a combination of hardware and software, and/or a combination of firmware and software or other like logic that may be provided in mobile device 102 for use in affecting a motion model within mobile device 102 based, at least in part, on one or more determined range rates for one or more wireless signals 106 acquired from one or more terrestrial transmitters 104. In certain example implementations, apparatus 110 may comprise all or part of a motion model and/or the like. In certain other implementations, apparatus 110 may be configured to affect all or part of a motion model and/or the like which may be provided via other logic within mobile device 102.

Figure 2:
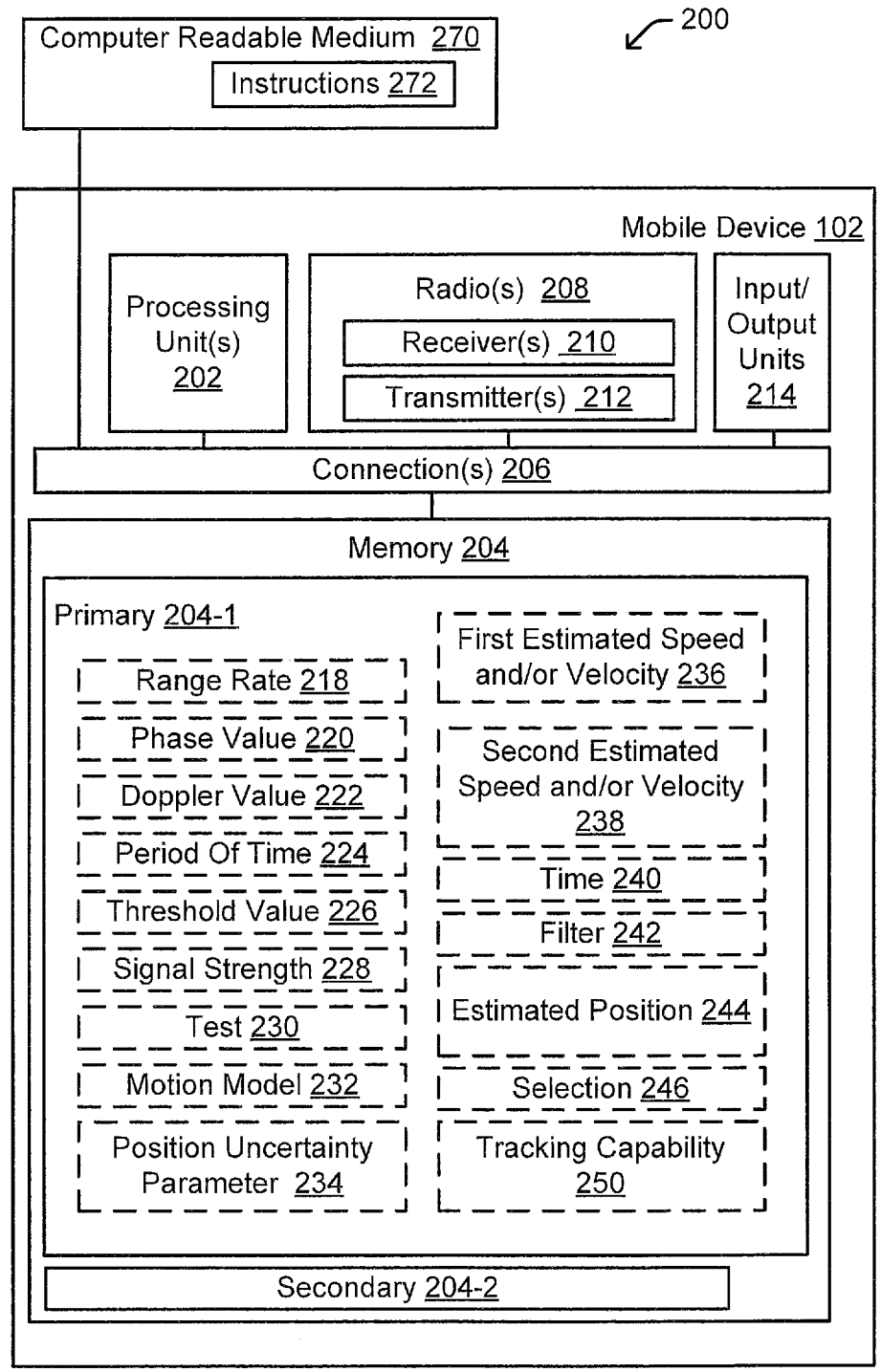
FIG. 2 is a schematic block diagram illustrating certain features of an example computing platform for use in affecting a motion model based, at least in part, on one or more determined range rates for one or more wireless signals acquired from one or more terrestrial transmitters, in accordance with an implementation.

In certain example implementations, mobile device 102 may function exclusively or selectively as a stand-alone device, and may provide a one or more capabilities/services of interest/use to a user. In certain example implementations, mobile device 102 may communicate in some manner with one or more other devices, for example, as illustrated by the wireless communication link to network(s) 120. Network(s) 120 may be representative of one or more communication and/or computing resources (e.g., devices and/or services) which mobile device 102 may communicate with or through, e.g., via one or more radios 208 (FIG. 2). Thus, in certain instances mobile device 102 may receive (or send) data and/or instructions via network(s) 120.

In certain example implementations, mobile device 102 may be enabled to receive signals associated with one or more wireless communication networks, location services, and/or the like or any combination thereof which may be associated with one or more terrestrial transmitters 104 and/or network(s) 120.

Mobile device 102 may, for example, be enabled (e.g., via one or more radios 208) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. In certain example implementations, the techniques provided herein may be applied to mobile devices capable of receiving various wireless broadcast technologies, such as, e.g., MediaFLO, ISDB-T, DVB-H, DTV, etc., from one or more terrestrial transmitters.

Attention is drawn next to FIG. 2, which is a schematic block diagram illustrating certain features of an example mobile device 102 in the form of a computing device 200 that may be used to affect a motion model 232 based, at least in part, on one or more determined range rates 218 for one or more wireless signals 106 acquired from one or more terrestrial transmitters 104 (FIG. 1), in accordance with certain example implementations.

As illustrated computing device 200 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, non-transitory computer readable medium 270. Memory 204 and/or computer readable medium 270 may comprise instructions 272 associated with data processing, e.g., in accordance with all or part of apparatus 110 (FIG. 1) and/or process 400 (FIG. 4), as provided herein.

One or more radio(s) 208 may be provided and used within mobile device 102 to acquire one or more wireless signals. For example, one or more receivers 210 may be provided to acquire one or more wireless signals from one or more terrestrial transmitters. In certain example implementations, one or more receivers 210 may also be provided which may be used to acquire wireless satellite positioning system (SPS) signals from one or more non-terrestrial base transmitters, such as, a space vehicle of a Global Navigation Satellite System (GNSS), or other like satellite based location systems.

As further illustrated, in certain implementations radio(s) 208 may also comprise one or more transmitters 212. A transmitter 212 may, for example, be used by mobile device 1022 communicate with network(s) 120, and/or one or more other resources (devices) 130 (FIG. 1).

In certain implementations, mobile device 102 may comprise one or more input/output units 214. Input/output units 214 may represent one or more user input mechanisms, one or more user output mechanisms, one or more wired network interfaces, one or more sensors, and/or the like or some combination thereof which may support additional functions that may be provided in whole or part by mobile device 102. A user input mechanism may, for example, comprise various buttons, switches, a touch pad, a trackball, a joystick, a touch screen, a microphone, a camera, and/or the like, which may be used to receive one or more user inputs. A user output device may, for example, comprise various devices that may be used in producing a visual output, an audible output, and/or a tactile output for a user. A wired network interface may, for example, comprise interface logic and one or more ports through which mobile device 102 may be interconnected with one or more other devices via a cable or fiber indication link. A sensor may, for example, comprise one or more inertial sensors (e.g., an accelerometer, a gyroscope, etc.), one or more environmental sensors (e.g., a barometer, a thermometer, a light sensor, a sound transducer, a strain gauge, etc.), and/or the like or some combination thereof.

Processing unit(s) 202 and/or instructions 272 may, for example, provide or otherwise be associated with one or more signals that may be stored in memory 204 from time to time, such as: instructions and/or encoded data relating to apparatus 110, one or more range rate(s) 218, one or more measured phase value(s) 220, one or more measured Doppler value(s) 222, a first period of time 224, one or more threshold value(s) 226, one or more measured signal strength(s) 228 (e.g., one or more measured Ec/Io values(s), etc.), one or more test(s) 230, one or more motion model(s) 232, one or more position uncertainty parameter(s) 234, a first estimated speed and/or velocity 236, a second estimated speed and/or velocity 238, a time subsequent to the first period of time 240, one or more filter(s) 242 (e.g., a particle filter, and/or the like), an estimated position 244 and/or other like estimated location, one or more selection(s) 246 of one or more candidate signals, a tracking capability 250, and/or the like or some combination thereof.

A range rate 218 may, for example, indicate a change or lack thereof in one or more measured phase values 220 and/or one or more measured Doppler values 222 for one or more acquired wireless signals at two or more points in time, e.g., during a first period of time. A measured phase value 220 may, for example, represent a measured phase of an acquired wireless signal at a particular point in time, e.g., sampled during a first period of time. In accordance with certain example implementations, a measured phase value 220 may represent a measured phase of a pilot and/or other like wireless signal transmitted by a terrestrial transmitter. For example, in certain implementations a measured phase value 220 may be based on a measured phase of an AFLT signal transmitted by a terrestrial transmitter. Similarly, a measured Doppler value 222 may, for example, represent a measured Doppler of an acquired wireless signal at a particular point in time, e.g., sampled during a first period of time. In accordance with certain example implementations, a measured Doppler value 222 may represent a frequency and/or center frequency of a pilot and/or other like wireless signal transmitted by a terrestrial transmitter. For example, in certain implementations a measured Doppler value 222 may be based on a measured frequency of an AFLT signal transmitted by a terrestrial transmitter.

A first period of time 224 may, for example, represent a contiguous period of time or two or more noncontiguous periods of time during which one or more acquired signals may be acquired one or more times, and from which one or more measured phase values 220 and/or one or more measured Doppler values 222 may be obtained. One or more range rates 218 for all or part of first period of time 224 may be determined based, at least in part, on one or more measured phase values 220 and/or one or more measured Doppler values 222. A threshold value 226 may also be determined based, at least in part, on one or more signal strength values and/or the like that may be obtained from one or more wireless signals acquired at some point during a first period of time 224. A threshold value 226 may, for example, be compared to one or more range rates 218, e.g. as part of one or more tests 230.

One or more motion model(s) 232 may, for example, be affected in some manner based, at least in part, on the result(s) of test(s) 230, as such result(s) may indicate that mobile device 102 was more likely in motion or more likely not in motion during all or part of the first period of time 224. For example, in certain implementations in response to a determination that a range rate 218 does not satisfy a test 230 based at least in part on threshold value 226, a motion model may be affected in some manner to decrease at least one position uncertainty parameter 234 so as to indicate that mobile device 102 was likely not in motion during all or part of first period of time 224. Here, for example, a position uncertainty parameter 234 may be considered by and/or otherwise input to one or more filter(s) 242 (e.g., a particle filter, etc.), which may be provided in motion model 232. Conversely, in response to a determination that such a range rate 218 satisfies such a test 230, such a motion model 232 may be affected in some manner to increase such at least one position uncertainty parameter so as to indicate that mobile device 102 was likely in motion during all or part of first period of time 224.

In still other example implementations, in response to a determination that a range rate 218 satisfies a test 230, a first estimated speed and/or velocity 236 of mobile device 102 may be determined. Thus, a first estimated speed and/or velocity 236 may be indicative of an estimated speed and/or velocity of mobile device 102 during a portion (one or more points in time) during first period of time 224 as may be determined based, at least in part, on one or more applicable measured phase values 220, one or more applicable measured Doppler values 222, one or more applicable range rates 218, and/or the like or some combination thereof.

In accordance with certain example implementations, a filter 242 and/or the like may be provided to propagate first estimated speed and/or velocity 236 to determine a second estimated speed and/or velocity 238 at some point in time 240 that is subsequent to first period of time 224. For example, filter 242 may comprise a particle filter and first estimated speed and/or velocity 236 may be propagated as a particle in determining a second estimated speed and/or velocity 238.

Furthermore, in accordance with certain example implementations, mobile device 102 may determine its estimated position 244 at some time subsequent to the first period of time 224 based, at least in part, on second estimated speed and/or velocity 238. For example, an estimated position 244 may indicate an estimated location of mobile device 102 within a specific environment 103 and/or environment 100 (FIG. 1).

It should be understood that there are variety of ways in which a location of a mobile device 102 and/or a terrestrial transmitter 104 may be identified. For example, various well-known coordinate systems may be used to relate relative positions between objects such as mobile device 102 and a terrestrial transmitter 104, etc.

A selection 246 of one or more candidate signals may, for example, indicate one or more wireless signals and/or corresponding terrestrial transmitters that mobile device 102 may attempt to acquire, or conversely not attempt to acquire. Selection 246 may, for example, be affected under certain conditions based on one or more of first estimated speed and/or velocity 236, second estimated speed and/or velocity 238, estimated position 244, and/or the like or some combination thereof which may be indicative of and/or otherwise relate to a determination that mobile device 102 may have been in motion or may not have been in motion during all or part of first period of time 224. Selection 246 may, for example, be based on almanac and/or other like network resource information (not shown) that may be obtained, for example, via one or more other resources (devices) 130, network(s) 120, etc., (FIG. 1).

A tracking capability 250 may, for example, represent logic capable of tracking and/or otherwise assisting in the determination of estimating a position/location of mobile device 102, e.g., with regard to some other object, some coordinate system, some electronic map (not shown), and/or the like or some combination thereof, based at least in part, on one or more acquired wireless signals 106. By way of example, tracking capability 250 may obtain and/or assist in determining one or more of a first estimated speed and/or velocity 236, a second estimated speed and/or velocity 238, an estimated position 244, and/or the like or some combination thereof. In certain example implementations tracking capability 250 may be part of a positioning function (not shown) capable of supporting various types of location based services, SPS, etc. In certain implementations, tracking capability 250 may support providing a user with information via one or more user output mechanisms and/or obtaining user inputs via one or more user input mechanisms.

Although not illustrated, it should be understood that mobile device 102 may comprise additional components not shown in FIG. 2. For example, mobile device 102 may comprise a power supply (e.g., a battery, etc.) and a power distribution system (e.g., conductors, circuitry, etc.).

Figure 3:
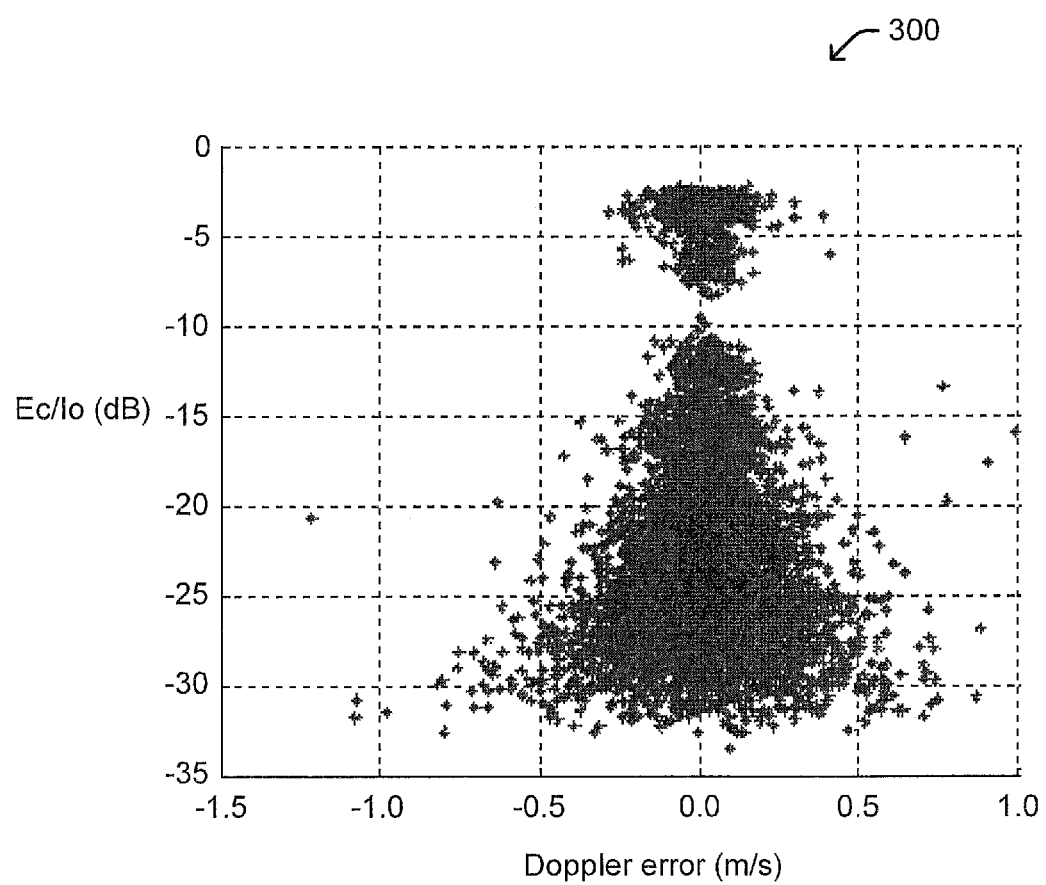
FIG. 3 a graph illustrating some example Doppler measurement errors plotted as a function of carrier energy/noise measurements for measured Doppler values of wireless signals acquired from a plurality of terrestrial transmitters by a mobile device that is not in motion, in accordance with an implementation.

Attention is drawn next to FIG. 3, which is a graph illustrating a plot 300 of some example Doppler measurement errors as a function of carrier energy/noise measurements for measured Doppler values of wireless signals acquired from a plurality of terrestrial transmitters by a mobile device that was not in motion, in accordance with certain example implementations.

More specifically, example plot 300 shows a distribution of Doppler measurement errors (m/s) on the horizontal axis versus measured carrier energy/noise (Ec/Io) measurements for a pilot signal in a cellular/AFLT application. From example plot 300 and may be seen that Doppler measurement errors may be quite small in general, and may increase as Ec/Io decreases. Furthermore, it has been observed that Doppler measurement errors do not appear to be significantly affected by the presence of multipath(s). Thus, for example, based, at least in part, on the underlying data of example plot 300 and/or the like, and assuming a particular statistical distribution of measurement errors as a function of Ec/Io, a threshold value 226 may be determined which may be used to provide motion detection performance (e.g., via a test 230) at a desired probability of detection/probability of false alarm. In certain further example implementations, a threshold value 226 may also be determined and/or otherwise affected in some manner based, at least in part, on other factors such as, for example, past performance, prior user interaction, and/or the like or some combination thereof.

In certain example implementations, for a mobile to use a Doppler measurement as an indicator of mobile motion it may be beneficial for a transmitted carrier to exhibit a particular level of accuracy and stability. Cellular base stations and/or other like transmitting devices, for example as is well known, are usually designed to meet particular operating requirements with regard to the accuracy of transmit frequencies. Since such a cellular base station may be stationary and transmit a very accurate frequency, a mobile device (e.g., assuming compensated for local oscillator error, etc.) may measure a Doppler shift of a received signal and a direct measurement of Doppler due to the motion or lack thereof of the mobile device itself. If, to the contrary, a large error in the base station transmit frequency (or a large residual LO error) were to exist, then, when measuring a received Doppler, a mobile device might measure a large Doppler value (e.g., measuring a transmit frequency and/or LO frequency error, etc.) and incorrectly infer that the mobile device is in motion when in fact the mobile device is stationary. Since cellular base stations and/or other like transmitting devices may have very accurate transmit frequencies and are usually stationary, one may rely on corresponding Doppler measurements as being indicative of motion or lack thereof of a mobile device. Moreover, various known techniques are available to provide compensation for LO errors in mobile devices operable with such cellular base stations and/or the like. It should be noted, that, at the time of this writing, in certain instances at least some transmitting devices provisioned for use in certain types of communication systems (e.g., WLAN, WiFi, etc.) may not provide a transmitted carrier of adequate accuracy and stability to enable certain techniques provided herein to reliably determine a mobile device's motion or lack thereof. However, it is believed that future deployments of such transmitting devices will provide transmitted carriers of adequate accuracy and stability to enable most if not all of the techniques provided herein to reliably determine motion or lack thereof with regard to a mobile device. For example, there is an expectation that access points and/or the like provisioned within a WLAN or the like may be time-synchronized. Hence, with such time synchronized transmitting devices, it may be possible to set a transmit frequency accurately since the same or a similar scheme as used to support accurate time synchronization may be leveraged to synthesize accurate transmit frequency.

Figure 4:
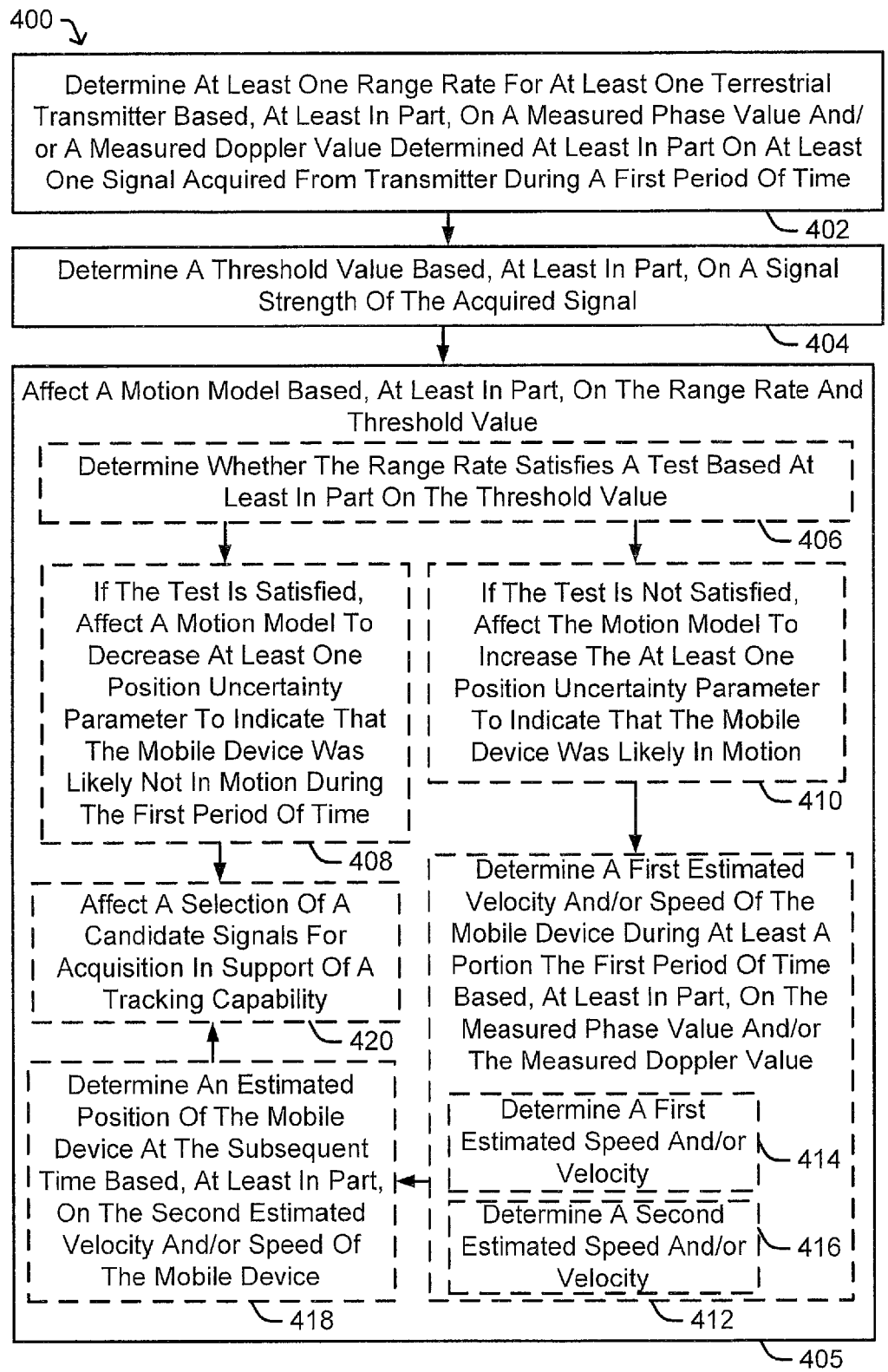
FIG. 4 is a flow diagram illustrating certain features of an example process or method for a mobile device for use in affecting a motion model based, at least in part, on one or more determined range rates for one or more wireless signals acquired from one or more terrestrial transmitters, in accordance with an implementation.

Attention is drawn next to FIG. 4, which is a flow diagram illustrating certain features of an example process or method 400 for a mobile device 102 for use in affecting a motion model 232 based, at least in part, on one or more determined range rates 218 for one or more wireless signals 106 acquired from one or more terrestrial transmitters 104, in accordance with certain implementations. Method 400 may, for example, be useful in a mobile device while it is located in a specific environment 103.

At example block 402, at least one range rate may be determined for at least one terrestrial transmitter based, at least in part, on a measured phase value and/or a measured Doppler value determined, at least in part, on at least one signal acquired from the terrestrial transmitter, e.g. at one or more points in time during a first period of time.

At example block 404, a threshold value may be determined based, at least in part, on a signal strength of the acquired signal. As previously mentioned, in certain example implementations additional factors may be considered in determining a threshold value.

At example block 405, a motion model may be affected based, at least in part, on the range rate and threshold value. By way of example, at example block 406, it may be determined whether a range rate satisfies a test based at least in part on a threshold value and at example block 408, in response to a determination that the test was satisfied, a motion model may be affected in some manner to decrease at least one position uncertainty parameter so as to indicate that the mobile device was likely not in motion during at least a portion of the first period of time. At example block 410, in response to a determination that the test was not satisfied, the motion model may be affected in some manner to increase at least one position uncertainty parameter so as to indicate that the mobile device was likely in motion during all or part of the first period of time. At example block 412, in response to a determination that the test was not satisfied, a first estimated speed and/or velocity of the mobile device during at least a portion the first period of time may be determined based, at least in part, on the measured phase value and/or the measured Doppler value. For example, at block 414, a first estimated speed and/or velocity may be determined based, at least in part, on a plurality of measured phase values and/or measured Doppler values from a plurality of signals acquired from a plurality of terrestrial transmitters. Additionally, at block 416, a second estimated speed and/or velocity of the mobile device at a time subsequent to the first period of time may be determined based, at least in part, on the first estimated speed and/or velocity, e.g., using a filter to propagate the first estimated speed and/or velocity to such subsequent time. At example block 418, an estimated position of the mobile device at a time subsequent to the first period of time may be determined based, at least in part, on the second estimated speed and/or velocity of the mobile device. At example block 420, a selection of candidate terrestrial transmitters/signals for possible acquisition may be affected in some manner in support of a tracking capability. For example, a selection of a candidate terrestrial transmitter/signals may be affected to include terrestrial transmitters that a mobile device appears to be moving towards and which may already be within a desired range or may soon be in such desired range, and/or removing terrestrial transmitters that the mobile device appears to be moving away from and which may be out of a desired range or may soon be out of such desired range.

In certain example implementations, certain techniques provided herein may be implemented to make use of range rate estimates to affect one or more processes in a mobile device. For example, a motion model may be affected based, at least in part, on a position uncertainty parameter determined using a range rate. Such a position uncertainty parameter may, for example, be indicative of a likelihood that a position of a mobile device changed during a period of time. In other instances, an estimated speed and/or velocity of a mobile device during a period of time may be determined, e.g., based, at least in part, on a measured phase value and/or a measured Doppler value. Accordingly, in certain implementations, at least one positioning capability of a mobile device may be affected in some manner based, at least in part, on a motion model, and/or possibly a range rate or the result of one or more tests based thereon, and/or an estimated speed and/or velocity. One potential benefit may be all or part of the processing associated with a positioning capability may be affected to save computing and/or power on the mobile device.

In certain example implementations, techniques provided herein may be implemented such that certain detected motion estimations may be provided by initially estimating a speed estimation and then velocity estimation, since speed is a magnitude of a velocity vector with represents a speed and heading. As provided herein, Doppler and Carrier Phase data may be used to provide range rate data along a path of wireless signal arrival. Such information may, for example, be used for speed and/or velocity determination provided that the transmitter locations are known, and the signals arrive along the line of sight to the transmitter. In multipath environments, such range rate observations may give some information on speed (e.g., actual speed<=maximum observed range rate) however, actual speed may be unknown, and a heading may be unknown. In such cases, one may obtain a crude speed estimate but no heading estimate and hence no velocity estimate. Thus, in certain instances there may be different levels or tiers of estimates coming from such range rate data. For example, a first level of information may comprise a likelihood determination and/or the like, via which a mobile device may be deemed (e.g., by a motion model) as being in either a stationary state or a non-stationary state. In certain example instances, a stationary state may comprise a stationary state, e.g., as might result from a mobile device resting on a stable object such as a desk or table. However, in certain other example instances, a stationary state may comprise a substantially stationary state, e.g., as might result from a mobile device located in a pocket of a person's clothing or briefcase while the person is standing still or sitting in a chair. A second level of information may comprise a speed estimate, which should be an improvement over the first level of information. A third level of information may comprise a velocity estimate, which should be an improvement the first and second levels of information. With this in mind, in certain example implementations a mobile device may affect (e.g., alter, select, etc.) one or more motion models based on a rudimentary stationary versus non-stationary characterization (e.g., affect a static model or a dynamic model), or a more refined based on a speed estimate (e.g., affect a static, dynamic_1, dynamic_2, . . . dynamic_N model).

In certain instances, in addition to affecting a motion model that may be used in a positioning capability and/or the like, one or more position uncertainty parameters and/or other information (e.g., from the levels of information described above) and/or the like, may be useful in affecting all or part of the positioning capability and/or other processes of the mobile device. Thus, for example, if a mobile device is deemed to be stationary, it may be useful to reduce a frequency of position attempts or defer positioning attempts indefinitely to save power. Conversely, it may be beneficial to maintain or possibly increase the rate of positioning attempts, etc., if a mobile device is deemed to be non-stationary (e.g., is moving or has moved). With a speed estimate, for example, a mobile device may scale the rate of positioning attempts as a function of the speed (e.g., slow fix rate for slow speeds, moderate fix rate for moderate speeds, high fix rate for high speed). There should be dependent claims where the rate of fix attempts is determined based in part on the motion detection parameter and/or speed which, in turn are determined based on the range rate data.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   determining a range rate for at least one terrestrial transmitter having a fixed location based, at least in part, on a measured phase value and/or a measured Doppler value determined based, at least in part, on at least one signal acquired from said at least one transmitter during a first period of time;
   determining a threshold value based, at least in part, on said at least one signal; and
   affecting a motion model based, at least in part, on a determination of whether said mobile device is in a stationary state or a non-stationary state, said determination of whether said mobile device is in said stationary state or said non-stationary state being based, at least in part, on said range rate and said threshold value.

2. The method of claim 1, and further comprising, at said mobile device:
   determining said threshold value based, at least in part, on a signal strength of said at least one signal.

3. The method of claim 1, and further comprising, at said mobile device:
   determining whether said mobile device is in said stationary state or said non-stationary state based, at least in part, on said motion model.

4. The method of claim 1, and further comprising, at said mobile device:
   affecting at least one positioning capability of said mobile device based, at least in part, on a motion model.

5. The method of claim 1, and further comprising, at said mobile device:
   determining a position uncertainty parameter based, at least in part, on said range rate, said position uncertainty parameter being indicative of a likelihood that a position of said mobile device changed during at least a portion of said first period of time.

6. The method of claim 5, wherein determining said position uncertainty parameter further comprises at least one of:
   in response to a determination that said range rate does not satisfy a test based at least in part on said threshold value, decreasing said position uncertainty parameter or setting said position uncertainty parameter to a first value to indicate that said mobile device was likely not in motion during said first period of time; or
   in response to a determination that said range rate satisfies said test, increasing said position uncertainty parameter or setting said position uncertainty parameter to a second value that is greater than the first value to indicate that said mobile device was likely in motion during said first period of time.

7. The method of claim 6, and further comprising, at said mobile device:
   in response to a determination that said range rate satisfies said test, determining a first estimated speed and/or velocity of said mobile device during at least a portion said first period of time based, at least in part, on said measured phase value and/or said measured Doppler value.

8. The method of claim 7, and further comprising, at said mobile device:
   determining said first estimated speed and/or velocity based, at least in part, on a plurality of measured phase values and/or a plurality of measured Doppler values from a plurality of signals acquired from a plurality of terrestrial transmitters at different fixed locations.

9. The method of claim 7, and further comprising, at said mobile device:
   determining a second estimated speed and/or velocity of said mobile device at a time subsequent to said first period of time based, at least in part, on said first estimated speed and/or velocity.

10. The method of claim 9, and further comprising, at said mobile device:
    determining said second estimated speed and/or velocity of said mobile device at said subsequent time to said first period of time using a motion model within a filter to propagate said first estimated speed and/or velocity to said subsequent time.

11. The method of claim 10, wherein said filter comprises a particle filter to propagate said first estimated speed and/or velocity to said subsequent time.

12. The method of claim 9, and further comprising, at said mobile device:
    determining of an estimated position of said mobile device at said subsequent time based, at least in part, on said second estimated speed and/or velocity of said mobile device.

13. The method of claim 9, and further comprising, at said mobile device:
    affecting a selection of one or more candidate signals for acquisition in support of a tracking capability based, at least in part, on said second estimated speed and/or velocity of said mobile device.

14. The method of claim 1, wherein said threshold value is based, at least in part, on a measured signal to noise and/or interference ratio.

15. The method of claim 1, wherein, during at least a portion of said first period of time, said mobile device is located within a specific environment comprising a Satellite Positioning Systems (SPS)-denied environment.

16. An apparatus for use in a mobile device, the apparatus comprising:
    means for determining a range rate for at least one terrestrial transmitter having a fixed location based, at least in part, on a measured phase value and/or a measured Doppler value determined based, at least in part, on at least one signal acquired from said at least one transmitter during a first period of time;
    means for determining a threshold value based, at least in part, on said at least one signal; and
    means for affecting a motion model based, at least in part, on a determination of whether said mobile device is in a stationary state or a non-stationary state, said determination of whether said mobile device is in said stationary state or said non-stationary state being based, at least in part, on said range rate and said threshold value.

17. The apparatus of claim 16, and further comprising:
    means for determining said threshold value based, at least in part, on a signal strength of said at least one signal.

18. The apparatus of claim 16, and further comprising:
    means for determining whether said mobile device is in said stationary state or said non-stationary state based, at least in part, on said motion model.

19. The apparatus of claim 16, and further comprising:
    means for affecting at least one positioning capability of said mobile device based, at least in part, on a motion model.

20. The apparatus of claim 16, and further comprising:
    means for determining a position uncertainty parameter based, at least in part, on said range rate, said position uncertainty parameter being indicative of a likelihood that a position of said mobile device changed during at least a portion of said first period of time.

21. The apparatus of claim 20, and further comprising at least one of:
means for decreasing said position uncertainty parameter or setting said position uncertainty parameter to a first value to indicate that said mobile device was likely not in motion during said first period of time, in response to a determination that said range rate does not satisfy a test based at least in part on said threshold value; or
means for increasing said position uncertainty parameter or setting said position uncertainty parameter to a second value that is greater than the first value to indicate that said mobile device was likely in motion during said first period of time, in response to a determination that said range rate satisfies said test.

22. The apparatus of claim 21, and further comprising:
means for determining a first estimated speed and/or velocity of said mobile device during at least a portion said first period of time, in response to a determination that said range rate satisfies said test, said first estimated speed and/or velocity being based, at least in part, on said measured phase value and/or said measured Doppler value.

23. The apparatus of claim 22, and further comprising:
means for determining said first estimated speed and/or velocity based, at least in part, on a plurality of measured phase values and/or a plurality of measured Doppler values from a plurality of signals acquired from a plurality of terrestrial transmitters at different fixed locations.

24. The apparatus of claim 22, and further comprising:
means for determining a second estimated speed and/or velocity of said mobile device at a time subsequent to said first period of time based, at least in part, on said first estimated speed and/or velocity.

25. The apparatus of claim 24, and further comprising:
means for determining said second estimated speed and/or velocity of said mobile device at said subsequent time to said first period of time using a motion model within a filter to propagate said first estimated speed and/or velocity to said subsequent time.

26. The apparatus of claim 25, wherein said filter comprises a particle filter to propagate said first estimated speed and/or velocity to said subsequent time.

27. The apparatus of claim 24, and further comprising:
means for determining of an estimated position of said mobile device at said subsequent time based, at least in part, on said second estimated speed and/or velocity of said mobile device.

28. The apparatus of claim 24, and further comprising:
means for affecting a selection of one or more candidate signals for acquisition in support of a tracking capability based, at least in part, on said second estimated speed and/or velocity of said mobile device.

29. The apparatus of claim 16, and further comprising:
means for determining said threshold value based, at least in part, on a measured signal to noise and/or interference ratio.

30. The apparatus of claim 16, wherein, during at least a portion of said first period of time, said mobile device is located within a specific environment comprising a Satellite Positioning Systems (SPS)-denied environment.

31. A mobile device comprising:
a receiver; and
a processing unit to:
during a first period of time, obtain via said receiver at least one signal transmitted from at least one terrestrial transmitter having a fixed location;
determine a range rate for said at least one terrestrial transmitter based, at least in part, on a measured phase value and/or a measured Doppler value determined based, at least in part, on at least one signal acquired from said at least one transmitter during a first period of time;
determine a threshold value based, at least in part, on said at least one signal; and
affect a motion model based, at least in part, on a determination of whether said mobile device is in a stationary state or a non-stationary state, said determination of whether said mobile device is in said stationary state or said non-stationary state being based, at least in part, on said range rate and said threshold value.

32. The mobile device of claim 31, said processing unit to further:
determine said threshold value based, at least in part, on a signal strength of said at least one signal.

33. The mobile device of claim 31, said processing unit to further:
determine whether said mobile device is in said stationary state or said non-stationary state based, at least in part, on said motion model.

34. The mobile device of claim 31, said processing unit to further:
affect at least one positioning capability of said mobile device based, at least in part, on a motion model.

35. The mobile device of claim 31, said processing unit to further:
determine a position uncertainty parameter based, at least in part, on said range rate, said position uncertainty parameter being indicative of a likelihood that a position of said mobile device changed during at least a portion of said first period of time.

36. The mobile device of claim 35, said processing unit to further:
in response to a determination that said range rate does not satisfy a test based at least in part on said threshold value, decrease said position uncertainty parameter or set said position uncertainty parameter to a first value to indicate that said mobile device was likely not in motion during said first period of time; or
in response to a determination that said range rate satisfies said test, increase said position uncertainty parameter or set said position uncertainty parameter to a second value that is greater than the first value to indicate that said mobile device was likely in motion during said first period of time.

37. The mobile device of claim 36, said processing unit to further:
in response to a determination that said range rate satisfies said test, determine a first estimated speed and/or velocity of said mobile device during at least a portion said first period of time based, at least in part, on said measured phase value and/or said measured Doppler value.

38. The mobile device of claim 37, said processing unit to further:
determine said first estimated speed and/or velocity based, at least in part, on a plurality of measured phase values and/or a plurality of measured Doppler values from a plurality of signals acquired from a plurality of terrestrial transmitters at different fixed locations.

39. The mobile device of claim 37, said processing unit to further:

determine a second estimated speed and/or velocity of said mobile device at a time subsequent to said first period of time based, at least in part, on said first estimated speed and/or velocity.

40. The mobile device of claim 39, said processing unit to further:
determine said second estimated speed and/or velocity of said mobile device at said subsequent time to said first period of time using a motion model within a filter to propagate said first estimated speed and/or velocity to said subsequent time.

41. The mobile device of claim 40, wherein said filter comprises a particle filter to propagate said first estimated speed and/or velocity to said subsequent time.

42. The mobile device of claim 39, said processing unit to further:
determine of an estimated position of said mobile device at said subsequent time based, at least in part, on said second estimated speed and/or velocity of said mobile device.

43. The mobile device of claim 39, said processing unit to further:
affect a selection of one or more candidate signals for acquisition in support of a tracking capability based, at least in part, on said second estimated speed and/or velocity of said mobile device.

44. The mobile device of claim 31, wherein said threshold value is based, at least in part, on a signal to noise and/or interference ratio.

45. The mobile device of claim 31, wherein, during at least a portion of said first period of time, said mobile device is located within a specific environment comprising a Satellite Positioning Systems (SPS)-denied environment.

46. An article comprising:
a non-transitory computer readable medium having stored therein computer implementable instructions executable by at least one processing unit of a mobile device to, with said mobile device:
determine a range rate for at least one terrestrial transmitter having a fixed location based, at least in part, on a measured phase value and/or a measured Doppler value determined based, at least in part, on at least one signal acquired from said at least one transmitter during a first period of time;
determine a threshold value based, at least in part, on said at least one signal; and
affect a motion model based, at least in part, on a determination of whether said mobile device is in a stationary state or a non-stationary state, said determination of whether said mobile device is in said stationary state or said non-stationary state being based, at least in part, on said range rate and said threshold value.

47. The article of claim 46, said computer implementable instructions being further executable by said at least one processing unit to:
determine said threshold value based, at least in part, on a signal strength of said at least one signal.

48. The article of claim 46, said computer implementable instructions being further executable by said at least one processing unit to:
determine whether said mobile device is in said stationary state or said non-stationary state based, at least in part, on said motion model.

49. The article of claim 46, said computer implementable instructions being further executable by said at least one processing unit to:
affect at least one positioning capability of said mobile device based, at least in part, on a motion model.

50. The article of claim 46, said computer implementable instructions being further executable by said at least one processing unit to:
determine a position uncertainty parameter based, at least in part, on said range rate, said position uncertainty parameter being indicative of a likelihood that a position of said mobile device changed during at least a portion of said first period of time.

51. The article of claim 50, said computer implementable instructions being further executable by said at least one processing unit to:
in response to a determination that said range rate does not satisfy a test based at least in part on said threshold value, decrease said position uncertainty parameter or set said position uncertainty parameter to a first value to indicate that said mobile device was likely not in motion during said first period of time; or
in response to a determination that said range rate satisfies said test, increase said position uncertainty parameter or set said position uncertainty parameter to a second value that is greater than the first value to indicate that said mobile device was likely in motion during said first period of time.

52. The article of claim 51, said computer implementable instructions being further executable by said at least one processing unit to:
in response to a determination that said range rate satisfies said test, determine a first estimated speed and/or velocity of said mobile device during at least a portion said first period of time based, at least in part, on said measured phase value and/or said measured Doppler value.

53. The article of claim 52, said computer implementable instructions being further executable by said at least one processing unit to:
determine said first estimated speed and/or velocity based, at least in part, on a plurality of measured phase values and/or a plurality of measured Doppler values from a plurality of signals acquired from a plurality of terrestrial transmitters at different fixed locations.

54. The article of claim 52, said computer implementable instructions being further executable by said at least one processing unit to:
determine a second estimated speed and/or velocity of said mobile device at a time subsequent to said first period of time based, at least in part, on said first estimated speed and/or velocity.

55. The article of claim 54, said computer implementable instructions being further executable by said at least one processing unit to:
determine said second estimated speed and/or velocity of said mobile device at said subsequent time to said first period of time using a motion model within a filter to propagate said first estimated speed and/or velocity to said subsequent time.

56. The article of claim 55, wherein said filter comprises a particle filter to propagate said first estimated speed and/or velocity to said subsequent time.

57. The article of claim 54, said computer implementable instructions being further executable by said at least one processing unit to:
determine of an estimated position of said mobile device at said subsequent time based, at least in part, on said second estimated speed and/or velocity of said mobile device.

58. The article of claim 54, said computer implementable instructions being further executable by said at least one processing unit to:

affect a selection of one or more candidate signals for acquisition in support of a tracking capability based, at least in part, on said second estimated speed and/or velocity of said mobile device.

59. The article of claim 46, wherein said threshold value is based, at least in part, on a signal to noise and/or interference ratio.

60. The article of claim 46, wherein, during at least a portion of said first period of time, said mobile device is located within a specific environment comprising a Satellite Positioning Systems (SPS)-denied environment.

* * * * *